Dec. 22, 1931. F. J. STRAUB Re. 18,298

BUILDING BLOCK

Original Filed Nov. 16, 1926

INVENTOR

Francis J. Straub by C. M. Cooke

Attorney

Reissued Dec. 22, 1931

Re. 18,298

UNITED STATES PATENT OFFICE

FRANCIS J. STRAUB, OF NEW KENSINGTON, PENNSYLVANIA

BUILDING BLOCK

Original No. 1,682,360, dated August 28, 1928, Serial No. 148,680, filed November 16, 1926. Application for reissue filed October 25, 1929. Serial No. 402,509.

My invention relates to an improvement in building blocks of the kind usually known as concrete blocks, made of any suitable aggregate, cement or other binder, and water.

The object in view is to provide a block formed in a pressing machine, with the usual core openings, in which such openings are not located midway between the opposite sides, but nearer to one side and more remote from the other, resulting in relatively thick and thin side wall portions.

Incidentally, it is also preferable to have the thin wall portions of denser consistency than the thick wall portions, which are of relatively more porous or lighter consistency.

In making my improved block, I utilize any suitable standard block forming press having clearance forming cores, filling and tamping mechanism, ejecting mechanism, and the other necessary features of such machines, but arranged to form the block of the present invention.

Figure 1:
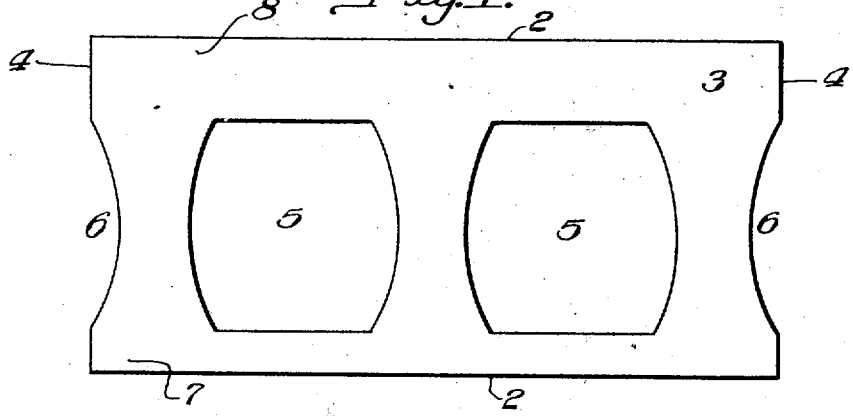
Fig. 1 is a plan view of a block embodying the invention.
Figure 2:
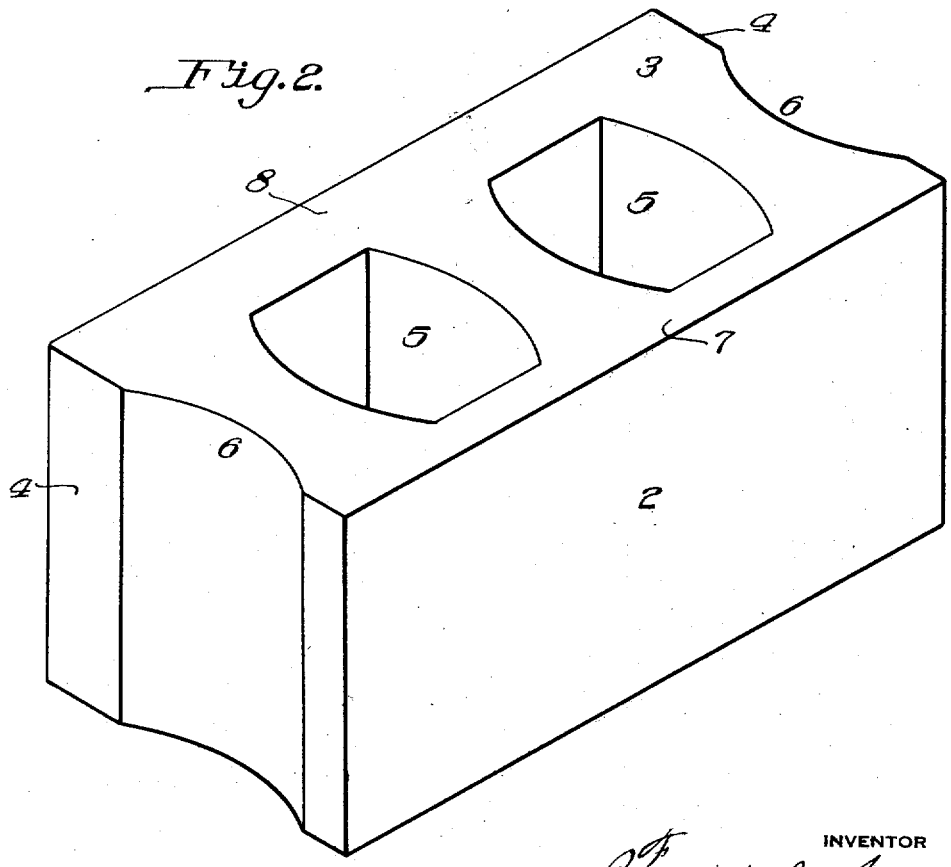
Fig. 2 is a perspective view thereof.

The block A is of usual standard outside dimensions, as 8″ x 8″ x 16″, having opposite side faces 2, 2, top and bottom faces 3, 3, and ends 4, 4. Core openings 5 and 6 are formed transversely of the block, within its body portion and across the ends, for lightness and ventilation, as is the common practice.

In the usual manufacture of blocks of the same general kind, whether made of sand and gravel aggregate or cinder and ashes or other suitable materials, with cement and water, the block is formed in a molding machine under the pressure of tamps or other compressing elements, and dried by air exposure.

Such blocks as now commonly made have a uniform consistency throughout, and with the transverse openings arranged midway of the block. the opposing walls being of substantially the same thickness.

In my present invention, I preferably locate the transverse openings 5 and 6 materially closer to one of the side faces 2 than the other, so that the intervening wall section 7 is considerably less in thickness than the opposite wall section 8, as clearly shown. However, the opposite sides may be of the same thickness, or of relatively different thickness, as desired.

Incidentally, the density of the thinner wall section is preferably greatly increased by additional pressure under the action of the tamps, etc. The opposite wall section 8 is correspondingly lighter and more porous, of a consistency usually prevalent throughout the entire body portion of the block.

In making blocks of a light, porous aggregate, such as cinder and ashes, like that of my Patent No. 1,212,840, the advantages of the invention are particularly realized in that the denser wall section 7 is better adapted to weather exposure, and provides for the laying of blocks in a wall with such thinner and denser portion exposed.

On the other hand, the less dense and more porous side 8, being on the inner side, is better adapted to application of plaster or other finishing, while also providing for the nailing thereon of trim or other wooden elements. A further advantage is that a comparatively wide area is provided for the placement and support thereon of floor joists or other wooden portions in a building.

In addition to the extra density of one of the walls, it may also be finished by the supplemental treatment in the molding machine of a vibrating or reciprocating wall portion thereof, giving a smooth trowelled surface effect, as is more fully set forth in my prior Patent No. 1,692,355.

In manufacturing my improved block, it will be understood that the molding machine is provided with the usual cores, properly offset to locate the core openings with the relative proportions of thin and thick sides, and that the usual lifting and supporting pallet is correspondingly modified to conform thereto.

The advantages of the invention will be readily appreciated by all those familiar with this class of building material.

The additional density of one of the walls adds but slightly to the weight, while the several advantages noted are features of value and greatly add to the durability, appearance and service of the block.

It will be understood that it may be made in various proportions and dimensions, number of transverse openings, or in other respects, but that all such advantages are to be understood as included within the scope of the following claims.

What I claim is:

1. A concrete building block composed of a continuously similar dried aggregate having transverse openings therethrough, and opposite relatively thick and thin side wall portions, the thin side wall portion being materially denser than the thick side wall portion.

2. A concrete building block composed of a continuously similar air dried aggregate having transverse openings therethrough, a continuously dense thin side wall portion at one side, and a continuously relatively open and porous thick side wall portion at the other side.

3. A building block composed throughout of continuously similar air dried concrete aggregate having a hard dense body portion at one side of an adjoining comparatively lighter porous portion, retaining all of its original aggregate components.

4. A concrete building block composed throughout of a continuously similar dried aggregate having transverse openings therethrough, a continuously dense wall portion at one side, and a continuously relatively open and porous wall portion at the other side, retaining all of its original aggregate components.

In testimony whereof I hereunto affix my signature.

FRANCIS J. STRAUB.